United States Patent

[11] 3,542,402

| [72] | Inventors | Allen S. Caples<br>Baltimore;<br>Davis T. Breckenridge, Owings Mills,<br>Maryland |
|---|---|---|
| [21] | Appl. No. | 824,017 |
| [22] | Filed | April 2, 1969 |
| [45] | Patented | Nov. 24, 1970 |
| [73] | Assignee | Catalyst Research Corporation<br>Baltimore, Maryland<br>a corporation of Maryland |

[54] JOINING ARTICLES OF THERMOPLASTIC RESINS
9 Claims, 6 Drawing Figs.

[52] U.S. Cl. ................................................. 285/21,
285/292, 285/423, 156/306, 85/54, 126/263
[51] Int. Cl. .................................................. F16l 13.02
[50] Field of Search .......................................... 285/21, 22,
292, 284, 423; 29/498.5; 228/56; 126/263;
156/155, 158, 275, 296, 306, 309; 85/54

[56] References Cited
UNITED STATES PATENTS

| 2,500,790 | 3/1950 | Bennett | 126/263 |
| 2,930,634 | 3/1960 | Merritt | 285/21 |
| 3,051,509 | 8/1962 | Wilton et al. | 285/21 |
| 3,378,672 | 4/1968 | Blumenkranz | 285/21X |
| 3,451,696 | 6/1969 | Hagelin et al. | 285/21 |
| 3,454,286 | 7/1969 | Anderson et al. | 285/21 |

Primary Examiner—Dave W. Arola
Attorney—Ronald H. Shakely

ABSTRACT: A metal tube containing pyrotechnic material that liberates substantially no gas on burning is imbedded in and adjacent a mating surface of an article of thermoplastic resin. The article is joined to another article of thermoplastic resin having a mating surface by bringing the mating surfaces together and igniting the pyrotechnic, forming a fused joint between the mating surfaces. A preferred pyrotechnic contains aluminum, boron, barium chromate and aluminum oxide.

Patented Nov. 24, 1970

INVENTORS
ALLEN SCOTT CAPLES
BY DAVIS T. BRECKENRIDGE
Ronald H. Shakely

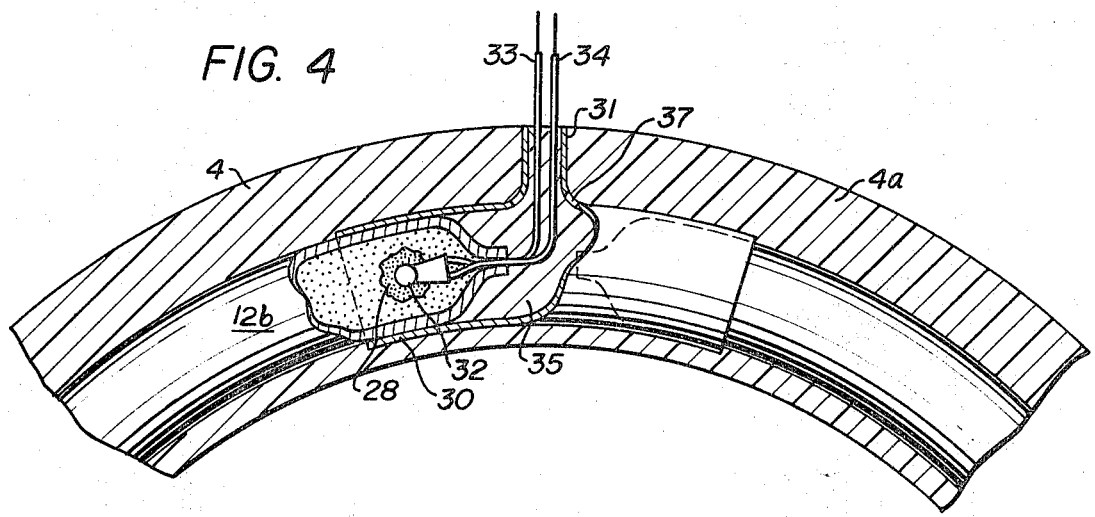
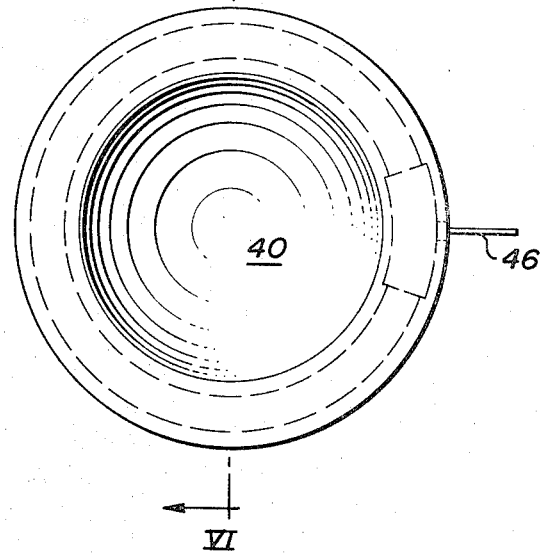
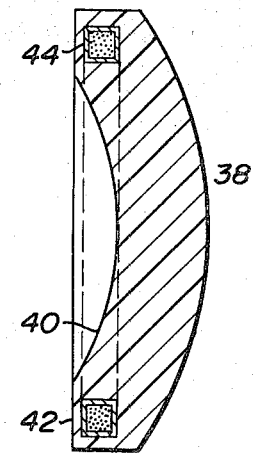
INVENTORS
ALLEN SCOTT CAPLES
BY DAVIS T. BRECKENRIDGE
Ronald H. Shakely 3,542,402

JOINING ARTICLES OF THERMOPLASTIC RESINS

This invention relates to joining together articles formed of thermoplastic resins by heating the articles with a pyrotechnic heat source to form a fused joint and to thermoplastic resinous articles having an integral pyrotechnic heat source.

In order to properly join together articles of thermoplastic resin with a pyrotechnic to form fused joints of uniform strength comparable to the inherent strength of the resin, it is essential to carefully control and distribute the heat generated by the pyrotechnic. Common difficulties include local overheating to the extent of charring the thermoplastic resin, nonuniform heating resulting in incomplete fusion of the thermoplastic in the joint, and the generation of hot gases that may cause bubbling or present a safety hazard. These problems are especially significant when joining together pieces of plastic pipe, such as polyethylene or polypropylene pipe, because it is necessary to obtain joints that are leak-free and will withstand hydraulic pressure.

An object of the present invention is to provide an article of thermoplastic resin, such as a pipe fitting, that has an integral pyrotechnic heat source for forming a fused joint with another thermoplastic article. Other objects will be apparent from the following description and claims.

In accordance with this invention, a metal tube is embedded in at least one of two pieces of thermoplastic resin to be joined; the metal tube contains a pyrotechnic containing a metal and an oxidizer that, when ignited, burns without the formation of any gaseous combustion products. In the preferred embodiment the tube containing the pyrotechnic is molded within the thermoplastic resin article contiguous to the joining surface. A preferred pyrotechnic material contains aluminum, boron, barium chromate and aluminum oxide.

In the drawings:

FIG. 4 is an enlarged fragmentary view partly cut away of another embodiment of pyrotechnic device for electrical ignition;

FIG. 5 is a bottom plan view of a rivet cover made in accordance with this invention; and FIG. 6 is a sectional view taken on line VI–VI of FIG. 5.

Figure 1:
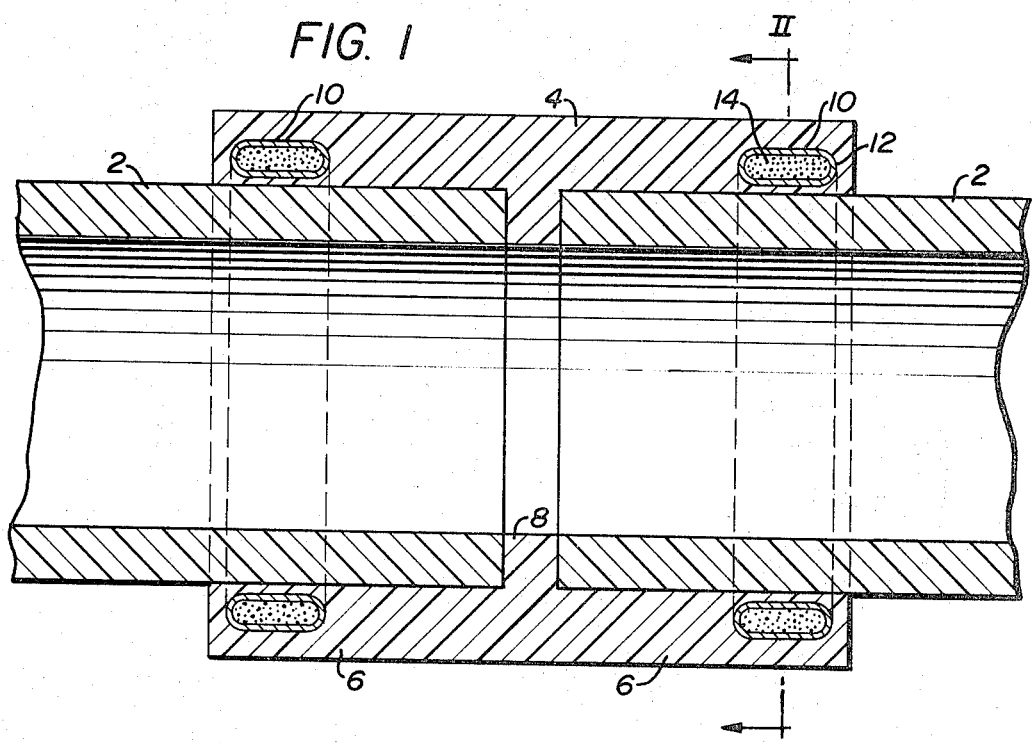
FIG. 1 is a sectional view of an assembled pipe joint in accordance with this invention.
Figure 2:
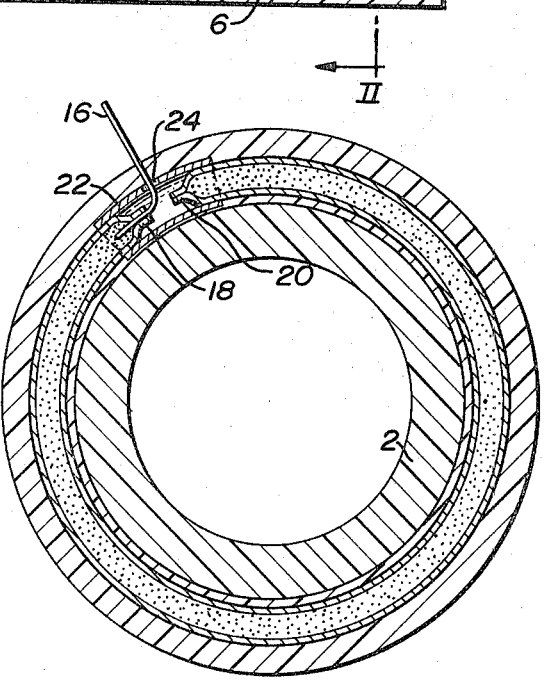
FIG. 2 is a sectional view taken on line II–II of FIG. 1.

Referring to FIGS. 1 and 2, thermoplastic tubing or pipe 2 is telescopically received by pipe fitting 4 made of like material. The fitting shown is a coupling; it will be appreciated that various other fittings of standard shapes, such as elbows, T's, Y's, caps are equally useable. The fitting 4 preferably has a collar or sleeve portions 6 to snugly receive pipe 2 and an internal flange 8 against which the pipe abuts when fully inserted in the fitting. A pyrotechnic device 10 is embedded in the collar portion of the fitting contiguous to the inside diameter, or mating surface, thereof. The pyrotechnic device is formed from a flattened metal tube 12 having its minor axis perpendicular to the mating surface and its larger major axis parallel to the mating surface and preferably is spaced not more than about 0.05 inches from the mating surface. The tube is filled with a combustible composition 14 that when ignited autogeneously exothermically reacts to produce only nongaseous reaction products. A pyrotechnic fuse 16 is secured into the tube 12, suitably by crimping the end 18 of the tube tightly around the fuse. The other end 20 of the tube is also sealed. Preferably, the two ends of the tube 12 are snugly fit into metal sleeve 22 which has an opening 24 through which the fuse is passed to the outside of the fitting. The tube may be of any metal but aluminum is most satisfactory because of its high heat conductivity, ease of forming and low cost.

Figure 3:
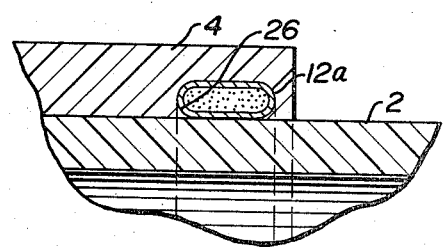
FIG. 3 is a sectional view of a portion of a modified assembled plastic pipe joint.

The pyrotechnic device is preferably molded into the fitting, suitably by conventional insert molding techniques, so that the metal tube is entirely surrounded by the thermoplastic fitting material. This provides intimate contact with the metal tube that permits maximum heat transfer to the thermoplastic resin. Alternatively, but less desirable, the pyrotechnic device can be inserted in a groove formed in the fitting as shown in FIG. 3. In order to provide improved heat transfer, the tube 12a is placed in the groove 26 and swaged to deform the tube tightly against the walls of the groove. To form the joint, the combustible composition is ignited by lighting the fuse and the resultant heat produced fuses the thermoplastic material in the fitting and pipe adjacent the metal tube. When cooled this forms a fused continuous joint.

For proper heat control essential to highly reliable and reproduceable joint formation, as well as for safety in use, it is necessary to use a chemical heat source that does not produce gaseous combustion products. When gas evolving compositions are used, such as conventional powders, nitroglycerine or the like, provision must be made for the discharge of the generated gases to prevent explosion; this results in the loss of a large and unpredictable amount of heat that is not utilized in fusing the thermoplastic. Similarly unpredictable amounts of the combustible material can be entrained in vented gases. Also, in the case of gas-generating chemical heat sources, the possibility of explosion due to entrapped gases is always present. The amount of heat required depends to some extent on the particular thermoplastic material to be joined, but for those melting between about 275° and 400°, such as the polyalkylenes, the combustible composition should provide between about 220–250 calories per square inch of metal tube surface. Also, suitable combustible compositions should yield between about 500 and 1500 calories/gram.

The preferred combustible composition for use in this invention contains between about (by weight): 2 percent to 4 percent, preferably 4 percent boron; 8 percent to 20 percent, preferably 19 percent aluminum; 66 percent to 90 percent, preferably 67 percent barium chromate; and 0 to 10 percent, preferably 10 percent aluminum oxide. The composition produces only solid reaction products on combustion and has provided between about 500 and 1000 calories per gram on combustion, higher proportions of aluminum fuel increasing the heat output and increasing amounts of the aluminum oxide diluent decreasing the heat output per unit weight. The preferred composition produces about 580 calories/gram. The burning characteristics of these compositions are unexpectedly insensitive to density variations brought about by varying amounts of consolidation, and no extensive consolidation is required to insure combustion propagation throughout a long path of small cross sections. This is of extreme practical importance since the composition can be poured into a tube and sufficiently consolidated merely by vibrating the tube; no compression or compaction of the mixture, as by a ram, is required. Similarly, variations in density of the compositions within the tube do not adversely affect the performance of the device. Even though the compositions are easily ignited, they are sufficiently stable to be incorporated in the tubes of the pyrotechnic device during molding of the device in the thermoplastic fitting.

A wide variety of other combustible compositions that undergo exothermic reaction without the liberation of any substantial amount of gas are known such as, for example, those described by Bennett U.S. Pat. No. 2,500,790. Such compositions yielding a combustion heat between about 500 and 1500 cal./gram are generally applicable to the invention. In general, these materials comprise one or more finely divided metals having high heats of combustion and as an oxidizing agent any of a variety of inorganic substances that react with the metals without the production of any substantial amount of gas, examples being chlorates, perchlorates and nitrates, particularly of the alkali metals, iron oxide, manganese dioxide, chromates, particularly of the alkali and alkaline earth metals, and others. The characteristics of these heat-liberating substances may be modified by the addition of inert diluent such as, for example, diatomaceous earth, aluminum oxide and similar uncombustible and nonreactive materials. The composition must, of course, be ignitable by such means as fuses or the well-known electric matches. In addition, in order to utilize the materials in the preferred embodiment wherein the pyrotechnic device is molded within the thermoplastic component, the combustible composition must not ignite at molding temperatures, generally on the order of 300 to 400°F.

Conventional fuses may be used, suitably those of the metal chlorate type, such as Thermolite igniter cord or safety fuse. The fuse train may contain a "first fire" mixture 28 comprising a metal and oxidizer within the metal tube to insure ignition of the main body of combustible composition. An illustrative first fire mixture suitable for use when molding the pyrotechnic device in the thermoplastic resin consists of 15 percent zirconium, 68⅓ percent barium chromate and 16⅔ percent of Vitron, a ceramic fiber.

FIG. 4 shows a modified article adaptable to be joined to other thermoplastic articles in explosive atmospheres. As previously described, the sealed tube 12b pyrotechnic device is molded in the thermoplastic material 4a. The ends of the tube 12b are held in sleeve 30 having a branch 31 extending to the outside surface of the plastic body 4a. The igniter 32 is a conventional electric match or squib inside the tube embedded in first fire mixture 28. Leads 33 and 34, suitably insulated, extend through the sealed end of the tube and the branch 31 of sleeve 30 for connection to a conventional power source to activate the igniter. The sleeve is filled with sealing compound 35, most suitably the source thermoplastic resin of body 4. Sealing can be accomplished when molding the tube in the thermoplastic material by providing holes 37 in the sleeve. Since all the ignitable material is hermetically sealed within the tube and the thermoplastic fitting, there are no sparks or hot spots that could initiate explosion in an ambient explosive atmosphere.

FIGS. 5 and 6 show a rivet cover made in accordance with this invention. In making lined vessels and the like, sheets of thermoplastic material are riveted to the vessel to form the lining. The rivet cover is fused to the lining covering the rivet to provide a continuous surface of thermoplastic material. The body 38 of the cover has a concave surface 40 to receive the rivet head. The surface 42, surrounding the rivet receiving portion, is shaped to mate with the vessel lining. A metal tube 44 containing pyrotechnic material is embedded in the body adjacent surface 42 and is provided with a fuse 46 in the same manner as previously described. In use, the rivet cover is positioned over the rivet and the fuse is lit, whereby the cover is fused securely to the lining.

We claim:

1. A device adapted to be joined to a thermoplastic resinous material comprising a thermoplastic resinous body having a mating surface, a metal tube embedded in said body contiguous with said mating surface, said metal tube containing a combustible composition that generates substantially no gas on burning, and means for igniting said composition, whereby a fused joint is formed.

2. A device according to claim 1 in which the metal tube is sealed and the ignition means extends through the wall of said tube.

3. A device according to claim 2 in which the ignition means comprises an electrical ignition within said tube.

4. A device according to claim 1 in which the combustible composition is a powder containing between about 2 and 4 percent boron, 8 and 20 percent aluminum, 66 and 90 percent barium chromate, and 0 to 10 percent aluminum oxide.

5. A thermoplastic resinous pipe fitting according to claim 1 comprising a conduit having an end portion with an inner surface adapted to snugly receive a conduit to which it is to be joined, a sealed metal tube embedded in said end portion contiguous with and encircling said inner surface, and a pyrotechnic fuse secured through said tube and extending outside the fitting conduit.

6. A device according to claim 5 in which the combustible composition is a powder containing between about 2 and 4 percent boron, 8 and 20 percent aluminum, 66 and 90 percent barium chromate, and 0 and 10 percent aluminum oxide.

7. A device according to claim 5 in which the metal tube has a major axis substantially parallel to said inner surface and has two adjacent closed ends, and a metal sleeve engaging said two ends.

8. A device according to claim 5 in which said sleeve has an opening and said fuse is secured through one of said ends and extends through said opening.

9. A thermoplastic resinous pipe fitting according to claim 3 comprising a conduit having an end portion with an inner surface adapted to snugly receive a conduit to which it is to be joined, said metal tube encircling said inner surface.